Figure 1:
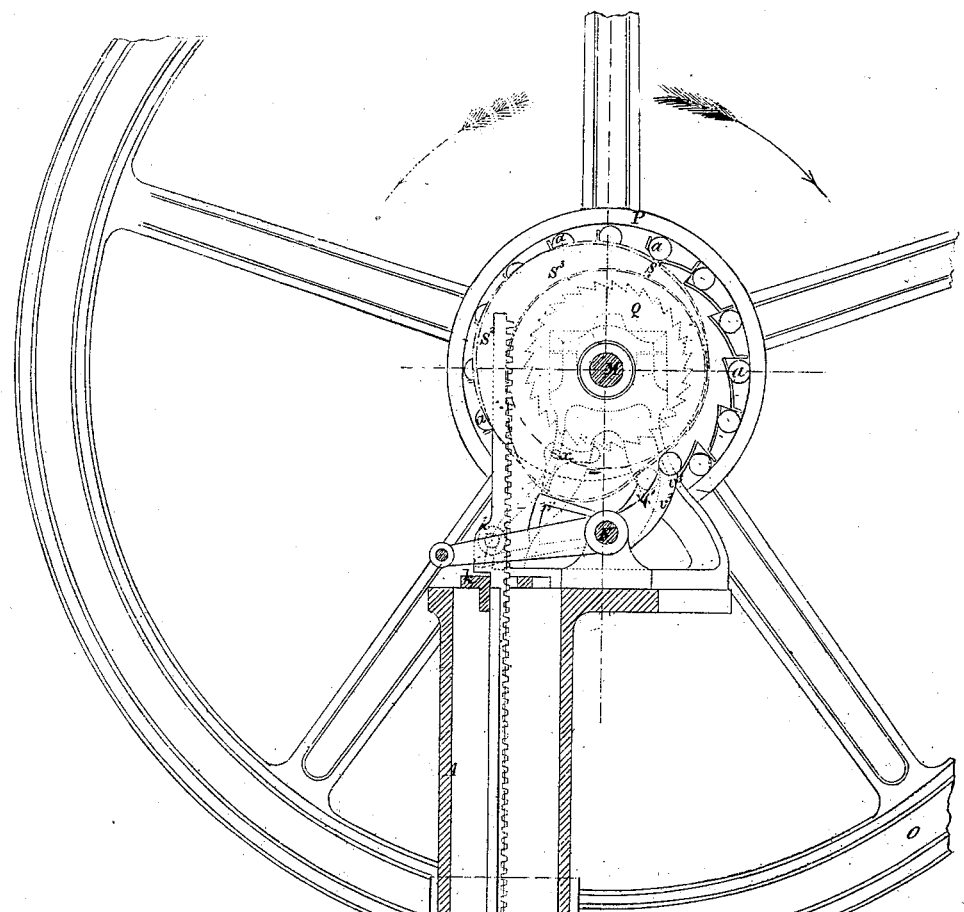

E. LANGEN & N. A. OTTO.
GAS ENGINE.

No. 67,659.        Patented Aug. 13, 1867.

Witnesses
M. Müller

Eugen Langen
N. A. Otto

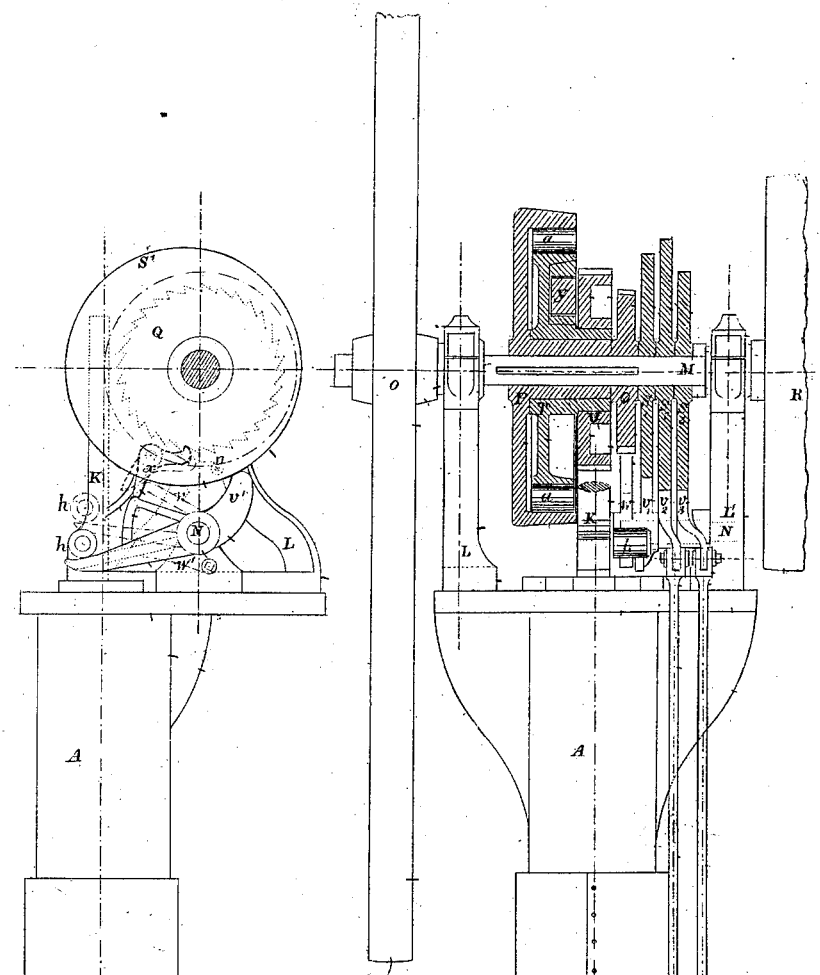

6 Sheets—Sheet 3.
E. LANGEN & N. A. OTTO.
GAS ENGINE.
No. 67,659. Patented Aug. 13, 1867.
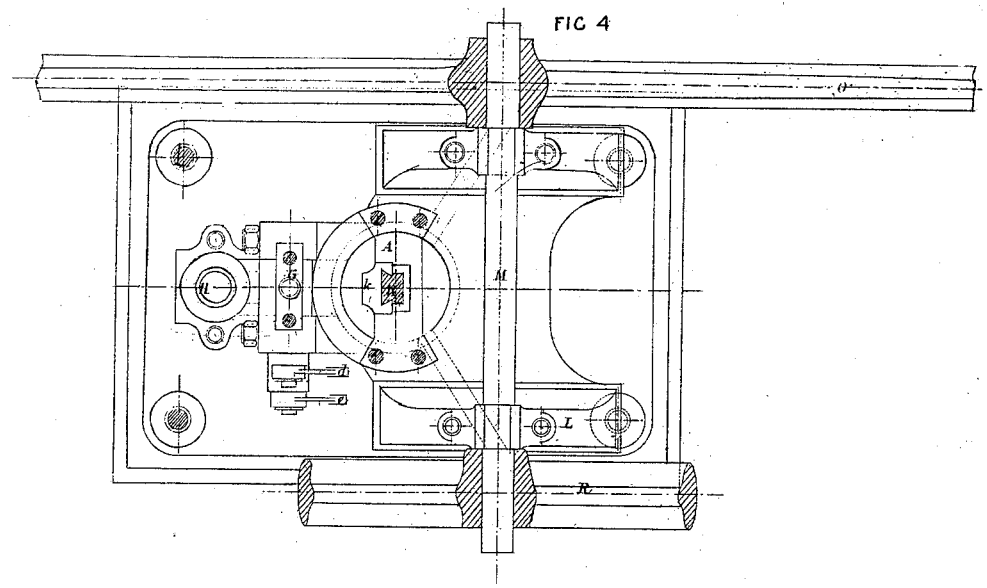
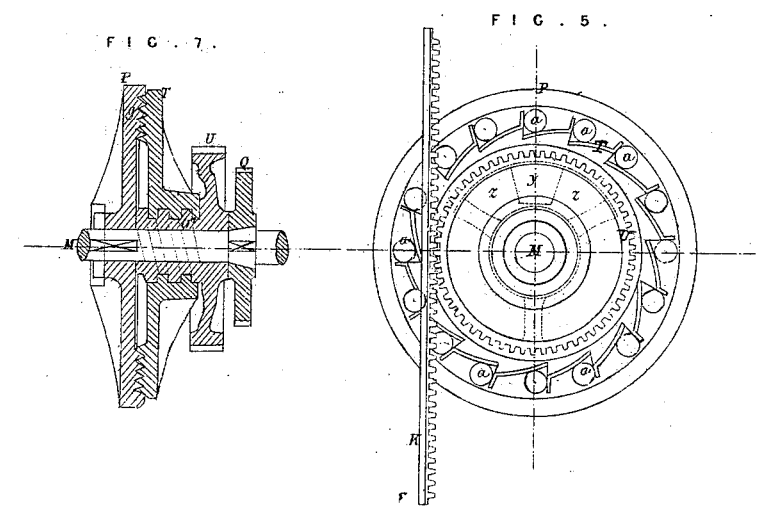
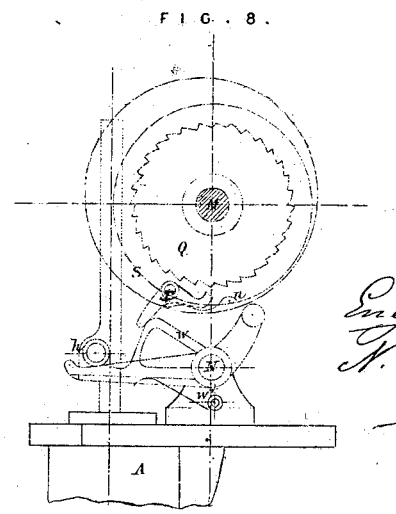
Witnesses
M. Müller
Eugen Langen
N. A. Otto

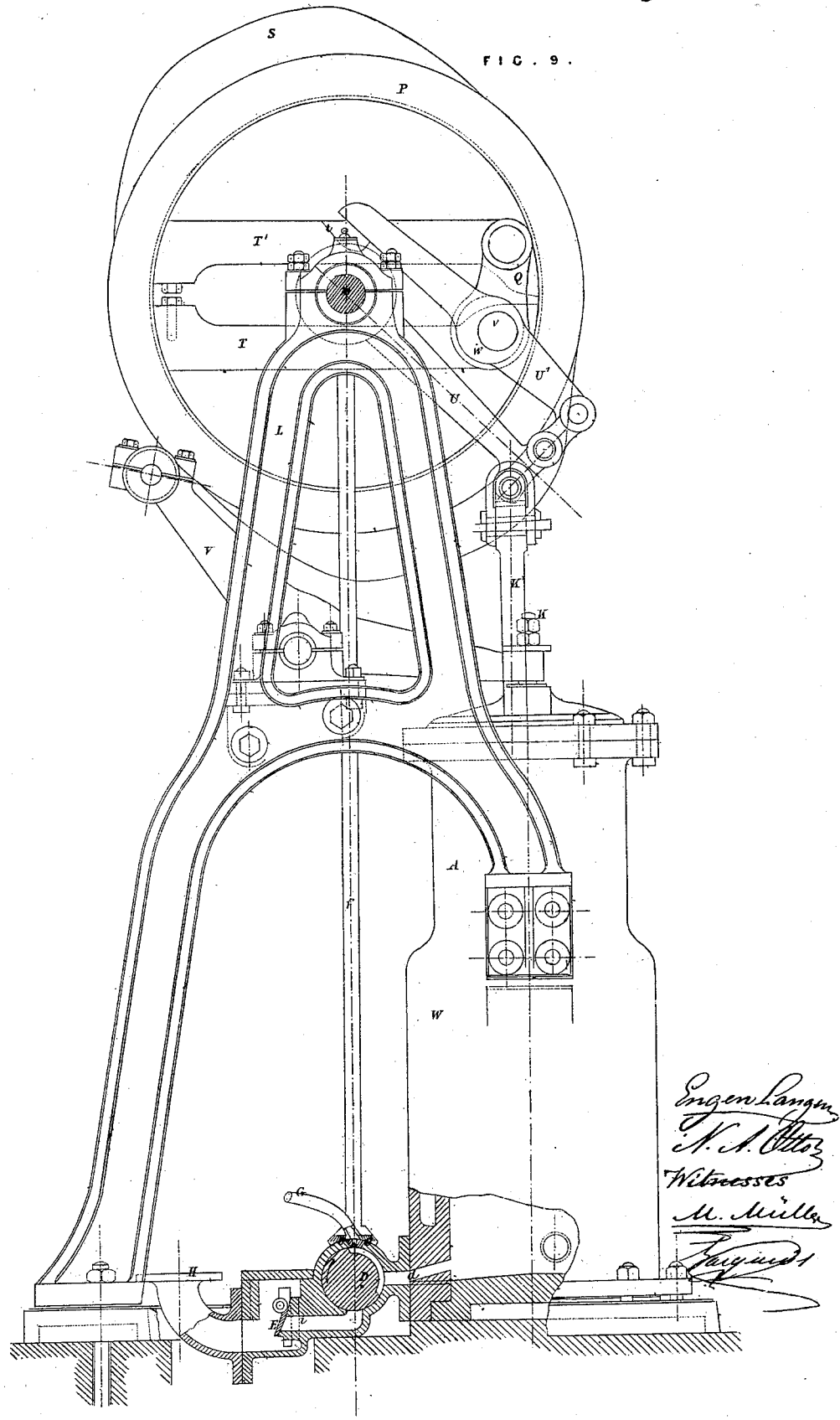

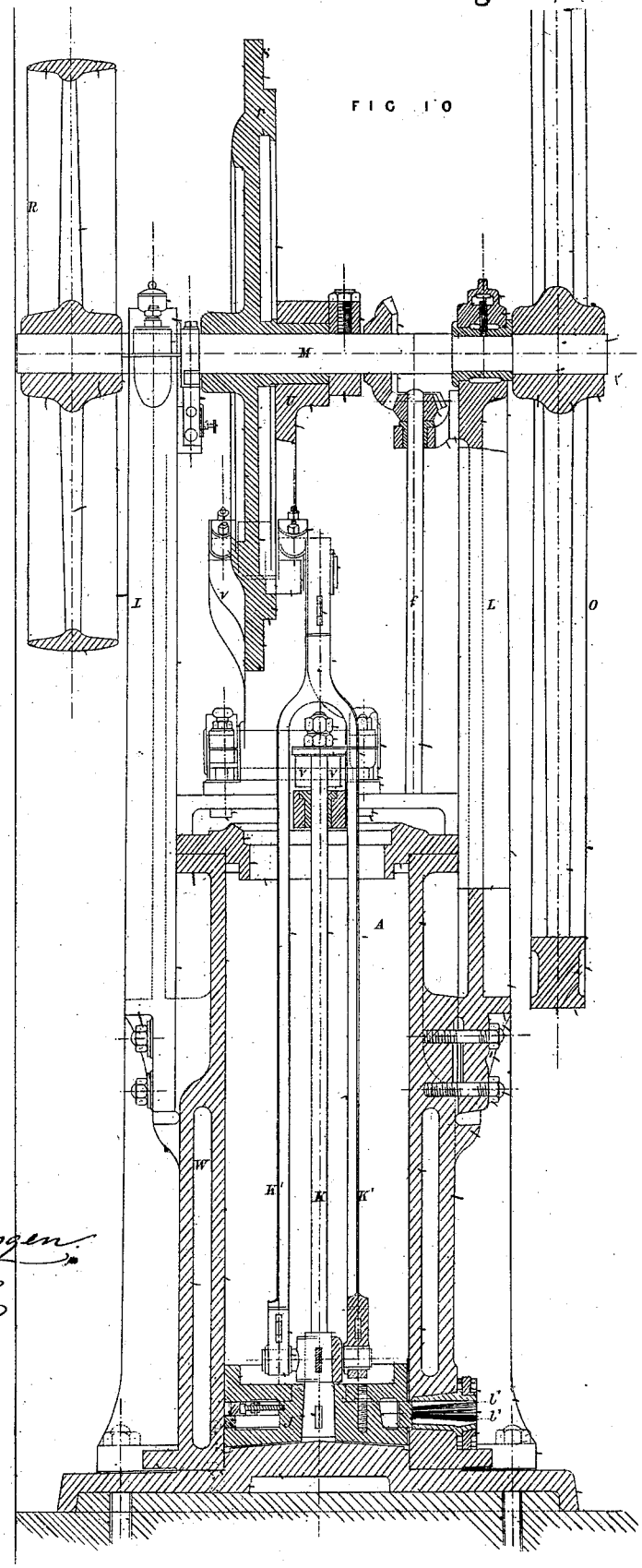

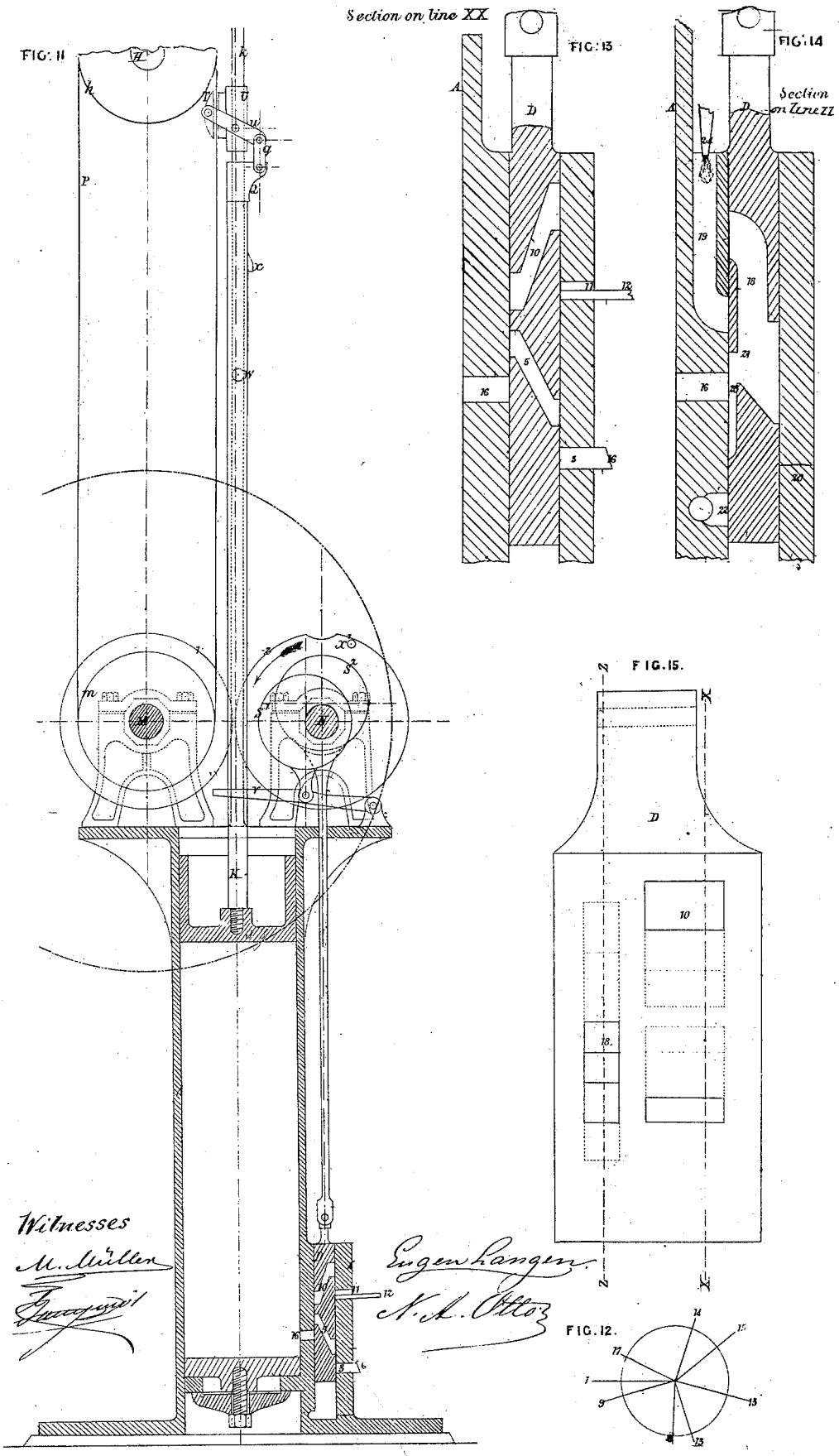

UNITED STATES PATENT OFFICE.

EUGEN LANGEN AND NICOL. AUG. OTTO, OF COLOGNE, PRUSSIA.

IMPROVEMENT IN AIR-ENGINES.

Specification forming part of Letters Patent No. 67,659, dated August 13, 1867.

*To all whom it may concern:*

Be it known that we, EUGEN LANGEN and NICOL. AUGUSTE OTTO, both of Cologne, in the Kingdom of Prussia, have invented an Improvement in Gas and Air Engines; and we do hereby declare that the following is a full and exact description of the said invention, reference being had to the accompanying drawings, and to the figures and letters marked thereon—that is to say:

In igniting combustible gases inside a closed metallic vessel the heat generated is imparted to the gaseous products of combustion, which, if prevented from expanding in consequence of such increase of temperature, will exert a proportionate pressure upon the surfaces of the closed vessel. This pressure would remain constant if no heat were taken away from the gases, but will in reality diminish rapidly in consequence of the heat generated being absorbed by the metallic surfaces of the vessel. Experience has shown that the interval of time which elapses between the heating and consequent expanding of the gases, and subsequent cooling and consequent contracting of the same, is but a very short one, and therefore in applying the expansive force of such heated gases as motive power, unless they are allowed to expand very rapidly immediately after the combustion has taken place, a great portion of the heat that should have produced such expansion will be absorbed by the cylinder of the engine, and consequently a great proportion of the motive power will be lost. In employing the ordinary arrangement of connecting-rod and crank motion for transmitting the expensive force of the gases behind the piston to the engine-shaft, such force has to overcome not only the work allotted to it, but also the inertia of the whole of the moving parts of the engine, in addition to which the motion of the piston is controlled in a very prejudicial manner by the action of the crank. The heated gases are thus prevented from expanding with anything like the requisite rapidity, and a considerable loss of useful effect consequently takes place, as above mentioned.

In the specification to certain Letters Patent for Great Britain and Ireland, granted to Richard Archibald Brooman for an invention of "improvements in air and gas engines," being a communication to him from one of us, and bearing date the 24th of August, 1863, No. 2,098, it was already proposed to remedy the before-mentioned defect of the gas-engine as heretofore constructed, by employing such an arrangement of engine that upon the ignition of the gases in the cylinder the gaseous products of combustion were allowed to expand with rapidity, without having to overcome any other resistance than the inertia of a very light displacing-piston, while the actual work was subsequently performed by the pressure of the atmosphere acting against the partial vacuum produced in the cylinder by the expansion and consequent cooling of the gases, such pressure being effected against a second piston in the same cylinder, which piston was connected to a crank-shaft in the ordinary manner.

The present invention consists in a peculiar arrangement of engines working on the principle above set forth, wherein the hot gases, in expanding, instead of acting upon a separate displacing-piston, as in the above-described arrangement, are made to act directly upon the working-piston, which, in performing its stroke consequent upon such action, moves entirely independent of the engine-shaft, and consequently without performing any work, while when it is caused to move in the contrary direction, by the pressure of the atmosphere against the partial vacuum formed behind it, it is connected to the engine-shaft, and causes the same to revolve, the connection with the engine-shaft and the valve-gear being at the same time so arranged that the number of strokes of the piston can be varied quite independently of the speed of the engine-shaft.

Figs. 1 to 8, on Sheets I, II, and III of the accompanying drawings, show one arrangement of engine whereby the before-described invention may be carried into practice. Fig. 1 shows a vertical section of the engine. Fig. 2 shows an end elevation of the same. Fig. 3 shows a side elevation, partly in section. Fig. 4 shows a plan, also partly in section; and Figs. 5 to 8 show detached elevations and sections of details.

Similar letters of reference indicate similar parts in each of the figures.

A is a cast-iron cylinder, closed at bottom in an air-tight manner by the cover B. This cylinder is surrounded by a cold-water jacket, $w$, open at top, the water in which serves simply to distribute the small amount of heat imparted to the cylinder at bottom equally throughout its length, and only requires renewing about once a month. $c$ is a separate casting, having two cocks, D and E, a flap-valve, F, the entrance-pipe G for the combustible gases, and the exit-pipe H for the products of combustion. J is a metal piston, to which is fixed the rod K, upon which a rack is formed, and this rod is guided in its motion by a guide, $k$, fixed upon the upper open end of the cylinder A, upon which are furthermore fixed two brackets, L L', supporting the fly-wheel shaft M and the spindle N. Upon the shaft M are fixed the fly-wheel O, the rim-disk P of a clutch apparatus, the ratchet-wheel Q, and the driving-pulley R, while loose upon the shaft are three cams, $S^1$ $S^2$ $S^3$, which are connected together in fixed relative positions.

Inside the rim-disk P is situated a disk, T, having cam-surfaces upon its circumference, and connected in an elastic manner to a spur-wheel, V, both being made to run loose upon the boss of the disk P. The spindle N is fixed in its bearings, and carries loose upon it, and independent of each other, three levers, $v^1$ $v^2$ $v^3$, and the disengaging-catch $w$. The eccentric or cam $S^1$ carries a pawl, $x$, by means of which the three cams are connected to, or disconnected from, the shaft M, according as the pawl is put in or out of gear with the ratchet-wheel Q, fixed upon the shaft, the throwing out of gear of the pawl being effected by the disengaging-catch $w$, in a manner to be hereafter described. The piston-rod rack K is in gear with the spur-wheel U, which is coupled to the cam-disk, T in an elastic manner, by means of a projecting stud, $y$, on each side of which is situated a piece of india-rubber, Z. (Shown at Fig. 5.) The rim-disk P and cam-disk T form, together with the small wooden rollers $a$ $a$, a clutch apparatus, (shown separately in Figs. 5 and 6,) by means of which the spur-wheel U can turn loose upon the shaft M in the direction of the full arrow, Fig. 1, but is caused to carry the shaft with it if turned in the direction of the dotted arrow.

The action of this apparatus is as follows: If the piston J is raised the piston-rod rack K turns the spur-wheel in the direction of the full arrow, independent of the shaft. If, on the other hand, the piston is moved downward the cam-disk T, in endeavoring to turn in the reverse direction, jams the wooden rollers $a$ $a$ tight between its cam-surfaces and the rim of the disk P, whereby the latter, and, consequently, also the shaft M, is forced to rotate with the disk T in the direction of the dotted arrow. For the clutch apparatus to be certain in its action it is only necessary to insure that the angle that the cam-surfaces form with the rim of the disk P is less than the slipping angle of wood upon iron.

By the above arrangement it will be seen that at every upstroke of the piston such motion simply effects the turning of the spur-wheel U loose upon the shaft M, while at every downstroke of the piston such motion will be imparted to the shaft in the direction of the dotted arrow, whereby the work of the engine will be performed. If we suppose such motion to be taking place, and the position of the moving parts to be that shown in Fig. 1, then the cam $S^2$ will begin to depress the one arm of the lever $v^2$, the other arm of which will begin to open the cock D to the gas-pipe G by means of the rod $f$ and the lever $d$, and will thus establish a communication between the gas-pipe G and air-passages $o$ $o$ and the bottom of the cylinder. At the same time the cam $S^3$ effects the turning of the cock E by means of the rod $g$ and lever $e$, so as to cut off the communication between the cylinder and the exit-pipe H. When the shaft M has turned a little farther, the cam $S^1$ depresses the one arm of the lever $v^1$, the other arm of which is made thereby to raise the piston J somewhat by pressing against the under side of a stud, $h$, upon the piston-rod K.

The area of the gas and air passages being properly proportioned, the space that is formed below the piston by the raising of the same is filled with an explosive compound, and by the time the piston has been raised to the required extent the motion of the shaft has caused the cock D to turn, so as to cut off the communication with the gas and air passages. Simultaneously an electric spark passes between the ends of the insulated wires $l^1$ $l^2$, the passing of the requisite electric current for this purpose being produced by any known arrangement of galvanic battery and current-breaker, actuated by the shaft M, an explosion of the combustible gas in the cylinder instantly takes place, and the expansive force of the heated gaseous products of combustion throws the piston rapidly upward in the cylinder, thereby turning the spur-wheel U and the disk T in the direction of the full arrow. As the gases expand beneath the piston they become rapidly cooler, and lose their expansive force, so much so indeed that they cease to exert any such force upon the piston before it has completed its upstroke, the last portion of which is effected against the pressure of the atmosphere, solely by virtue of the momentum which has been imparted to the piston at the commencement of the stroke. By the time that the piston has arrived at the top of its upstroke the cooling of the gases, consequent on their expansion, and to a small extent on the absorption of some of their heat by the surfaces of the cylinder, has caused them to contract to the volume which they occupy under a low temperature, whereby a partial vacuum is produced in the cylinder below the piston, and the pressure of the atmosphere, in acting against such vacuum, now forces the piston downward, whereby the turning of the shaft M is effected, and consequently the work of the engine performed, as before described. As the piston approaches the bottom of downstroke the cam S³ turns the cock E, so as to effect a communication between the cylinder and the passage i, leading to the escape-pipe H, and the piston, in falling by its own weight to the bottom of the cylinder, forces the condensed gaseous products of combustion through the flap-valve F into the escape-pipe H.

The object of the valve F is to prevent atmospheric air from passing into the cylinder through the pipe H, should the cock E begin to open before the piston has arrived in such a position that no partial vacuum exists beneath it. The gas-pipe is provided with a cock, (not shown on the drawing,) by means of which the quantity of gas that passes into the cylinder at each stroke may be so regulated that by its explosion the piston is only thrown up in the cylinder to a certain height, and thus the power of the engine decreased or increased as may be required. As, however, the useful effect of the engine is greatest when the piston is raised to a certain height, it is preferable to regulate the power of the engine in such a manner that the stroke of the piston always remains the same, while the number of strokes during a certain interval is made to vary according to the power required, and independently of the speed of the shaft M, which may be considered as constant, so that when a greater amount of power is required of the engine the piston makes a greater number of strokes, while, if a less amount of power is required, the piston makes a less number of strokes, in a given time. For this purpose the action of the valve-gear of the engine is rendered independent of the speed of the engine-shaft by the following arrangement: If the catch w were not in existence the cam S, actuating the valves, would be permanently connected to the engine-shaft by means of the pawl x and ratchet-wheel Q, and consequently at each revolution of the shaft the piston would perform one up-and-down stroke. The catch w is however acted upon by a spring, w', so as, if not depressed, to assume the position shown in dotted lines, Figs. 2 and 8, in which position it will strike against the arm of the pawl x when this has performed one revolution together with the cams, and in thus putting the pawl out of gear with the ratchet-wheel Q the catch will cause the cams to remain stationary until, by the downward motion of the piston, the stud h, upon the piston-rod, strikes against the arm of the catch w and depresses it, so as to allow of the pawl being put into gear with the ratchet-wheel by the action of the spring n. As soon as this takes place the cams S again revolve with the shaft, and actuate the valves or cocks, as described. The pipe H is provided with a cock, p, by closing which, more or less, the exit of the condensed products of combustion from the cylinder may be more or less throttled, and thus the downward motion of the piston toward the end of the stroke, more or less retarded. If the cock p is full open the piston arrives at the end of its downstroke just in time for the stud h to depress the catch w before the pawl x passes the latter, and thus to prevent the cams S being thrown out of gear.

Under these conditions the piston performs one up-and-down stroke for every revolution of the crank-shaft, and the engine works with its maximum power. If it is required to reduce the power of the engine, then, by throttling the escape-pipe H, the downward motion of the piston is retarded, and the stud h, consequently, fails to depress the catch w at the required moment, so as to allow the pawl x to pass. The latter is, consequently, thrown out of gear, and the cams S are caused to remain stationary until the piston arrives in the position for depressing the catch. The pawl x then springs in gear with the ratchet-wheel Q, and the cams S begin to move, so as to open the gas and air passages for a fresh upstroke. By this arrangement the piston can be made to perform any less number of double strokes than the shaft M performs revolutions in a given time.

It will be seen that, although in performing the first part of the downstroke, the piston must necessarily move with the same speed as the shaft M, yet the before-described retardation of the motion of the piston at the end of the stroke can take place, because as soon as the motion of the piston is checked the rollers a a of the clutch apparatus loosen their hold, and the spur-wheel U runs loose upon the shaft.

If the work that the engine has to perform is not of a uniform nature the power can be regulated in the above-described manner automatically by the application of any suitable known form of governing or regulating apparatus—such as the ordinary conical pendulum, which, in receiving motion from the engine-shaft, may be made to close the throttle-valve of the escape-pipe more or less, as the load on the engine decreases or increases.

In the above-described arrangement, in place of the clutch contrivance described for rendering the spur-wheel U alternately fast and loose on the shaft M, as described, the arrangement shown in section at Fig. 7 may be employed. In this case the spur-wheel U has a projecting boss, U', formed on one side of it, upon which boss is formed a screw-thread, as shown. Upon this boss the movable part T of a friction-clutch fits with a female screw, while the other part P of the clutch is fixed on the shaft M. From this arrangement it will be seen that if the wheel U is turned in one direction by the upstroke of the piston it will screw the clutch T toward it, and, consequently, out of gear with the part P, and the wheel U will then run loose upon the shaft, whereas if the wheel U is turned in the reverse direction the clutch T is screwed toward the fixed part P, so that the grooved rings g are pressed into each other, and the wheel is thus made fast with the shaft.

In place of imparting the motion of the piston to the engine-shaft in the manner above described, an arrangement may be employed, as indicated at Figs. 9 and 10, on Sheets IV and V of the drawings, which show, respectively, an elevation and a vertical section of a modified arrangement of the engine. Here the spur-wheel V of the former arrangement is replaced by a lever or crank, U, the boss of which fits loose upon the shaft M while the other end is hinged to a forked connecting-rod, K′, the lower end of which is hinged to the piston J. The lever U receives a reciprocating motion from the piston J by means of the connecting-rod K′, forming an angle of about forty-five degrees above and below the horizontal line at the end of each stroke, as indicated in Fig. 9, and it is connected to the movable part of a clutch apparatus upon the shaft M in such a manner that in performing the upstroke it turns loose on the shaft, while when performing the downstroke it causes the shaft M to turn with it. The clutch apparatus for this purpose may be arranged either as described with reference to Figs. 1 to 8, or as shown at Fig. 9, where the lever U is connected by a link to a second lever, U′, which works on a pin, y, carried by a bar, T. This bar is connected to a second bar, T′, by means of a link, Q, the one end of which fits upon an eccentric, w, formed on the back of the lever U′. The ends of the bars T T′, when in the relative position shown on the drawings—that is, when the lever U is commencing its upstroke—fit loosely inside the rim of the disk P, fixed on the shaft M, such relative position of the bars T T′ remaining the same during the entire upstroke on account of the end of the lever U′ resting against the stud t on the bar T′. When the lever U commences its downward motion, however, it draws the lever U′ down with it, and, by thus turning, the eccentric w forces the two bars T T′ apart, and thereby causes the ends of the same to be jammed tight in the rim of the disk P, which, together with the shaft M, is thus caused to move with the lever U. Upon the circumference of the disk P are formed the cams S S, acting upon the lever v, for slightly raising the piston J at the end of each downstroke, the piston being in this case arranged to work with a constant speed of two upstrokes for every revolution of the shaft M, for which purpose, also, the admission of gas and air is in this case regulated by means of a revolving valve, D, receiving motion from the shaft M by means of a pair of bevel-wheels, as shown. The other parts of the engine are designated by the same letters of reference as the corresponding parts in the previous arrangement, and need not be further described.

Figs. 11 to 15, on Sheet VI of the accompanying drawings, show another modification of the improved engine. Fig. 11 shows a sectional elevation of the same; Fig. 12, shows a diagram of the positions of the eccentrics, and Figs. 13 to 15 show enlarged details of the regulating-slide D. In this arrangement the motion of the engine-shaft M is imparted to the mill-shaft H by means of an endless band, P, passing over the pulleys m and h, and the piston J is caused to impart only its downward motion to the endless band P, in the following manner: To the piston J are fixed two piston-rods, K, a slight distance apart, connected together at top by means of a piece, Q, which slides upon a rod, k, of a rectangular transverse section fixed to the top of the cylinder A, and situated between the two piston-rods, to which it acts as a guide. Upon this rod is a second sliding-piece, U, carrying two levers, u, hung upon pins, on each side of the slide U. The one end of each of these levers is connected by a link, q, to the piece Q, while the other end is hinged to the plate T. The endless band P passes between the plate T and the slide U, and the levers u are placed in such a position that on commencing the upstroke the piston-rods, with the connecting-piece Q, in approaching the slide U, and coming in contact with the end thereof, so as to impart their motion to it, cause the levers u to move the plate T away from the slide U, whereby the band P passes perfectly free between the two, and the piston J, consequently, performs its upstroke quite disconnected from the engine-shaft. On the other hand, when the piston commences its downward motion, the piston-rods, in moving away from the slide U, before imparting their motion to it, draw the levers, and with them the plate T, in such a position that the band P is jammed tight between the plate T and slide U, and the piston J in performing its downstroke is therefore caused to impart its motion by means of the band P to the shafts M and H, as in the previous arrangements. The admission of combustible gas and air into the cylinder, and the escape of the products of combustion therefrom, are in this arrangement effected by means of a slide-valve, D, actuated by means of an eccentric, $S^2$, on the shaft N, while a second eccentric, $S^1$, effects the raising of the piston J at the end of downstroke, as before described, by means of the lever u pressing against a stud, w, on the piston-rod.

The shaft N, upon which the eccentrics are fixed, receives for this purpose a periodical rotary motion from the shaft M, by means of a friction-wheel, 1, on the latter, in gear with a space friction-wheel, 2, on the former, the space-wheel remaining stationary at the end of every revolution, when the space comes round to the point of contact between the two. The length of time during which the shaft N remains stationary is regulated by the motion of the piston J, the piston-rod K of which is provided with a stud, x, which, as the piston approaches the end of downstroke, comes in contact with a stud, x′, upon the space-wheel 2, and thus turns the latter slightly in the direction of the arrow, so as to bring it in gear with the friction-wheel 1 again, and thus to cause it to perform another revolution, whereby the eccentrics $S^1$ $S^2$ effect, respectively, the motion of the slide-valve D, and the raising of the piston at the end of its downstroke. When the shaft N is stationary the position of the eccentric $S^2$ must be such as to cause the slide-valve D to effect a communication between the interior of the cylinder A and the aperture 3 in the valve-box 4, by means of the passage 5. By means of the valve 6, however, the communication between the cylinder A and the atmosphere is cut off as long as there is any partial vacuum in the cylinder. The several positions of the eccentrics are indicated at the diagram, Fig. 12. If the shaft N is stationary the eccentric $S^2$ is in the position 7, and therefore the slide-valve D is in the middle position, with the passage 5 effecting the communication between the cylinder and the atmosphere, as before mentioned. The eccentric $S^1$, on the other hand, is at that time situated at its lowest point 8, being at right angles to $S^2$, and consequently the lever $v$ is in its lowest position. When the shaft N commences its motion the slide-valve moves downward, and when the eccentric $S^2$ has arrived at the point 9 the communication between the cylinder and the atmosphere is cut off, while a communication is established by the passage 10 of the valve between the cylinder and the air and gas passages 11 and 12. At the same time the eccentric $S^1$ has moved to the point 13, and consequently the lever begins to raise the piston J. Air and gas therefore now pass into the cylinder, while the eccentric $S^2$, and with it the slide-valve, moves down from point 9 to 8, and rises again from 8 to 13* The eccentric $S^1$ has, during the same time, moved from 13 to 14, and consequently the piston J has been raised to its full height preparatory to the ignition of the gases. Arrived at point 13* the eccentric $S^2$ causes the communication between the gas and air passages and the cylinder to be cut off, and, when it has risen to 15, the ignition of the gases in the cylinder takes place. The aperture 16 to the cylinder remains closed by the slide-valve until the eccentric $S^2$ has reached the point 17. The passage 5 then again commences to establish a communication between the cylinder and the atmosphere, and, by the time the eccentric $S^2$ reaches the point 7 again, such communication is full open, and now remains so in consequence of the shaft N and eccentrics coming to a stand-still. When the piston has arrived at the end of downstroke the motion of the shaft N and the action of the eccentrics and slide-valve commence as before. The ignition of the mixture of gas and air in the cylinder may in this case be effected by a lighted gas-jet, instead of an electric spark, the arrangement of the valve for which purpose is shown in the section of the slide-valve at Fig. 14. The passage 18 is so formed as to establish a communication between the passage 19 and aperture 20 when the valve is in its lowest position. At the same time the communication between the aperture 16 to the cylinder and the passage 18 is cut off by the part 21 of the valve, while a communication is established between the passages 18 and 22 by the channel 23. Through 22 combustible gas now passes into the passage 18, where it becomes mixed with air entering through the aperture 20. This mixture, in escaping through the passage 19, becomes ignited by a gas-jet, 24, kept constantly burning, and while the gas is being ignited and burns in the passage 18, the valve moves up so as to establish a communication between such passage and the cylinder-opening 16, and thus the ignition of the explosive mixture in the cylinder is effected.

The mode of regulating the power of the engine by controlling the exit of the waste gases is effected in a similar manner to that described in the first arrangement, and need therefore not be further described.

Having now described the nature of this invention and the manner in which it is to be performed, we wish it to be understood that we do not limit ourselves to the precise arrangements of the improved engine hereinbefore described with reference to the accompanying drawings, as these may be variously modified without departing from the nature of the invention. Thus, the engines may be arranged either in a vertical position, as shown, or in an inclined or horizontal position, in which latter case the action of gravity upon the piston in performing the last portion of its downstroke, as before described, may be replaced by the action of the spiral spring, connected in any suitable known manner to the piston-rod, so that the forward stroke of the piston causes the spring to be wound up, while during the backstroke the spring, in unwinding, presses upon the piston in the manner required. Also, if greater power is required of the engine than can be advantageously afforded by a single cylinder, two or more cylinders may be made to act upon one and the same driving-shaft.

Furthermore, we wish it to be understood that we are aware it has already been proposed to construct gas and air engines in which the explosion of the gases is caused to throw forward the piston without performing work, such work being performed by the return-stroke of the piston under the pressure of the atmosphere, and we therefore do not claim this, generally, nor do we claim the various details of our improved engine, when taken separate and apart from their combination, substantially as set forth; but

What we claim is—

1. The peculiar mode of communicating the downward or backward motion of the piston under atmospheric pressure only to the engine-shaft, by means of a clutch apparatus, so arranged that the speed of the piston is rendered independent of the speed of the engine-shaft.

2. The cams or eccentrics $S^2$ arranged for controlling the valves or slides for the admission of the combustible gas into, and exit of the products of combustion from, the cylinder, when actuated in such a manner from the engine-shaft through the mediation of the eccentric or cam $S^1$, pawl $x$, ratchet-wheel Q, and disengaging-catch $w$, that such admission and exit of gases, and consequently the number of strokes of the piston, may be varied independently of the speed of the engine-shaft, substantially as and for the purpose hereinbefore set forth.

3. The combination of the several parts K, $h$, P, T, U, Q, $S^1$, $S^2$, $v'$, $w$, and $x'$, operating in manner and for the purposes substantially as set forth.

In testimony whereof we have signed our names to this specification in the presence of two subscribing witnesses, this 18th day of May, one thousand eight hundred and sixty-seven.

EUGEN LANGEN.
NICOL. AUG. OTTO.

Witnesses:
  MICHEL MÜLLER,
  JACQUARD.